US 6,857,955 B1

United States Patent
Held

(10) Patent No.: US 6,857,955 B1
(45) Date of Patent: Feb. 22, 2005

(54) VENTILATION EXTENSION KIT

(76) Inventor: Steven M Held, 300 Parkside Ave., Miller Place, NY (US) 11764

( * ) Notice: Subject to any disclaimer, the term of this patent is extended or adjusted under 35 U.S.C. 154(b) by 0 days.

(21) Appl. No.: 10/454,810

(22) Filed: Jun. 4, 2003

(51) Int. Cl.$^7$ .................................................. B60H 1/00
(52) U.S. Cl. ......................... 454/144; 454/152; 454/143
(58) Field of Search ................................ 454/144, 152, 454/121, 143, 306

(56) References Cited

U.S. PATENT DOCUMENTS

| | | | | |
|---|---|---|---|---|
| 1,966,882 A | * | 7/1934 | Bucklen ................. | 237/12.3 B |
| 2,055,843 A | | 9/1936 | Helfinstine | |
| 2,146,826 A | | 2/1939 | Knapp | |
| 2,344,864 A | * | 3/1944 | Griswold ...................... | 62/229 |
| 3,127,931 A | | 4/1964 | Johnson | |
| 3,394,887 A | * | 7/1968 | Megargle et al. ........ | 237/12.3 A |
| 3,550,522 A | | 12/1970 | Bauer | |
| 3,919,926 A | * | 11/1975 | Yamada ....................... | 454/144 |
| 4,035,018 A | | 7/1977 | Erbele et al. | |
| 4,343,230 A | * | 8/1982 | Lundstrom ................... | 454/144 |
| 4,782,742 A | * | 11/1988 | Yott et al. .................... | 454/152 |
| 4,840,115 A | | 6/1989 | Johnson et al. | |
| 5,052,283 A | * | 10/1991 | Altus .......................... | 454/144 |
| 5,312,155 A | * | 5/1994 | Akima et al. ........... | 297/180.13 |
| 5,823,869 A | * | 10/1998 | Paturzo ........................ | 454/152 |
| 5,839,293 A | * | 11/1998 | Teitelbaum et al. ............ | 62/244 |
| 5,902,181 A | * | 5/1999 | Bain .......................... | 454/144 |
| 6,105,667 A | * | 8/2000 | Yoshinori et al. ............ | 165/202 |
| 6,129,627 A | * | 10/2000 | Jankowski et al. ........... | 454/155 |
| 6,341,814 B1 | | 1/2002 | Honninger et al. | |
| 6,497,275 B1 | * | 12/2002 | Elliot ........................ | 165/204 |
| 6,604,785 B2 | * | 8/2003 | Bargheer et al. ......... | 297/180.14 |
| 6,616,522 B2 | * | 9/2003 | Colinet ........................ | 454/121 |

FOREIGN PATENT DOCUMENTS

GB          2.302.404          1/1997

* cited by examiner

Primary Examiner—Derek S. Boles
(74) Attorney, Agent, or Firm—Michael I. Kroll

(57) ABSTRACT

The present invention 10 discloses a ventilation extension addition to a vehicle 12 and is attached to the existing ventilation duct 14 located mid-way under the front seats 16 of the vehicle. The location of the existing ventilation duct 14 restricts any air or heat from getting to the rear seat 18 occupants. The present invention 10 comprises a flexible hose 20 attached at one distal end to an adjustable vent 22 and attached at the other distal end by means of a sleeve 24 to the existing air duct 14 located under the front seat 16 of the vehicle 12. The air vent 22 of the present invention 10 is secured in place by means of hook and loop fasteners 26 attached to the top portion of the vent and its counter part attached to the bottom rear portion of the seat 16. The flexible hose 20 allows the seat 16 to move backward and forward without disconnection of the present invention 10.

3 Claims, 8 Drawing Sheets

VENTILATION EXTENSION KIT

BACKGROUND OF THE INVENTION

1. Field of the Invention

The present invention relates generally to automobile ventilation systems and, more specifically, to a ventilation extension addition to a vehicle and is attached to the existing ventilation duct located mid-way under the front seats of some sports utility vehicles. The location of the existing ventilation duct restricts any air or heat from getting to the rear seat occupants. The present invention, a vehicle air ventilation extension kit consists of a flexible hose attached at one distal end to an adjustable vent and attached at the other distal end, by means of a sleeve, to the existing air duct located under the front seat of a vehicle. The air vent of the present invention is secured in place by means of hook and loop fasteners attached to the top portion of the vent and its counter part attached to the bottom rear portion of the seat. The flex hose allows the seat to move back and forward without the disconnection of attaching parts.

2. Description of the Prior Art

There are other vents designed for the improvement of air circulation. Typical of these is U.S. Pat. No. 2,055,843 issued to Helfinstine on Sep. 29, 1936.

Another patent was issued to Knapp on Feb. 14, 1939, as U.S. Pat. No. 2,146,826. Yet another U.S. Pat. No. 3,127,931 was issued to Johnson on Apr. 7, 1964 and still yet another was issued on Dec. 29, 1970 to Bauer as U.S. Pat. No. 3,550,522.

Another patent was issued to Erbele, et al. on Jul. 12, 1977 as U.S. Pat. No. 4,035,018. Yet another U.S. Pat. No. 4,840,115 was issued to Johnson, et al. on Jun. 20, 1989. Another was issued to Honninger, et al. on Jan. 29, 2002 as U.S. Pat. No. 6,341,814 and still yet another was issued on Jan. 1, 1997 to Hajime, et al. G.B. Patent No. 2,302,404.

U.S. Pat. No. 2,055,843

Inventor: Leroy C. Helfinstine

Issued: Sep. 29, 1939

The combination with a seat of a closed automobile, a box mounted in the rear portion of said seat, a fan mounted for rotation in-said box, means for rotating said fan, an exhaust manifold under said seat, a jacket surrounding said manifold, a grilled opening for said manifold to receive external air for heating by said manifold, a vertical tube connected between the said jacket and the fan box for delivering heated air to said box, a horizontal tube communicating with the vertical tube, and being open at its outer end to the external air around said scat, and a valve. In the vertical tube for closing it against the passage of heated air from said jacket to the fan box, and for opening it to the horizontal tube whereby cooler air may be admitted therethrough to the fan box in the summertime.

U.S. Pat. No. 2,146,826

Inventor: Archer L. Knapp

Issued: Feb. 14, 1939

A ventilating system for motor vehicles comprising means formed in the cowl for the entrance of air into a vehicle, means for conducting part of said air into the roof portion of the vehicle and means for conducting part of said air into the cowl space.

U.S. Pat. No. 3,127,931

Inventor: Laurence H. Johnson

Issued: Apr. 7, 1964

A method of subjecting the person of an occupant of a seat portion in an automotive compartment to the temperature modulating effect of a flow of air, said method comprising selectively forcing air to flow by blower means from said compartment free of the influence of an air heater and in paths contiguous to said person and immediately from about said person into the interior of said seat portion in one direction while imparting a cooling effect on said person, and forcing air to flow by blower means through a heater and in the opposite direction outward from said seat portion interior while imparting a heating effect on said person.

U.S. Pat. No. 3,550,522

Inventor: Edward J. Bauer

Issued: Dec. 29, 1970

A telescopic, portable heating and cooling unit for the rear seat portion of an automobile for use with conventional heating or cooling systems, has a feed duct, a telescopically attachable bifurcated duct, a pair of telescoping obtuse ducts and a pair of telescoping outlet ducts. The unit provides for the controlled passage of amounts of heated or cooled air to various portions of the rear seat area of automobiles by vent and baffle means and is readily transferred from one automobile to another.

U.S. Pat. No. 4,035,018

Inventor: Kurt Erbele et al.

Issued: Jul. 12, 1977

A device for distributing conditioned air over a row of chairs, especially over a row of individual chairs, while at least a portion of the seats of a row of seats is mounted on a common supporting beam. The conditioned air is passed through the supporting beam designed as a hollow body. Provided on the supporting beam are air outlet devices for discharging the conditioned air into the space or room to be air conditioned.

U.S. Pat. No. 4,840,115

Inventor: Paul Johnson et al

Issued: Jun. 20, 1989

An air outlet arrangement of an air-conditioning system for the rear space of a passenger motor vehicle is provided with a pivotal outlet channel that carries at its free end a ventilation grill and is integrated in its entirety in at least one pivot position spatially in, respectively, at interior equipment components arranged in the passenger motor vehicle rear space, for example, in the housing of the air outlet arrangement which, in its turn, accommodates a complete heating-, air-conditioning unit. In another embodiment, the outlet channel is tied to the back side of the backrest of the passenger motor vehicle front seat and extends nearly up to the upper end of the backrest. An optimum air-conditioning of the rear space is possible from this position.

U.S. Pat. No. 6,341,814

Inventor: Anton Honninger, et al

Issued: Jan. 29, 2002

The invention relates to an open motor vehicle such as a convertible, roadster or the like, which has a vehicle body, a drive device with internal combustion engine, gearbox and exhaust system, a vehicle interior with at least one vehicle seat with backrest and headrest and a fresh-air/heating device. In order to increase the air-conditioning comfort when driving with the top down and in order to improve the sense of well-being of the vehicle occupants, the fresh-air/heating device has at least one air vent which is provided in the vehicle interior behind that at least one vehicle seat, and at least one air duct which is connected to the air vent and to which air which has been heated by the waste heat of the drive device can be fed.

G.B. Patent Number 2.302,404

Inventor: Mochizuki Hajime, et al.

Issued: Jan. 15, 1997

A center vent duct, left and right side vent ducts and left and right side defroster ducts are blow molded as one body of a plastic material. Both vent ducts and defrost ducts linearly extend to the left and right of the center vent duct. The ducts are offset from the defroster ducts. Provided with supply openings, respective end portions of the defrost ducts are separated from respective end portions of the vent ducts. The end portion of the defroster ducts are provided with bellows allowing adjustment of the position of the supply openings of the defrost ducts relative to side defrost grills of an instrumental panel. Further, each defrost duct includes two flanges near the supply opening for attachment with the instrumental panel and vent duct.

While these air circulation devices may be suitable for the purposes for which they were designed, they would not be as suitable for the purposes of the present invention, as hereinafter described.

SUMMARY OF THE PRESENT INVENTION

The present invention discloses a ventilation extension addition to a vehicle and is attached to the existing ventilation duct located mid-way under the front seats of the vehicle. The location of the existing ventilation duct restricts any air or heat from getting to the rear seat occupants. The present invention comprises a flexible hose attached at one distal end to an adjustable vent and attached at the other distal end by means of a sleeve to the existing air duct located under the front seat of the vehicle. The air vent of the present invention is secured in place by means of hook and loop fasteners attached to the top portion of the vent and its counter part attached to the bottom rear portion of the seat. The flexible hose allows the seat to move backward and forward without disconnection of the present invention.

A primary object of the present invention is to provide a ventilation addition to a vehicle that is attached to the existing vent duct located mid way under front seats of some sports utility vehicles.

Another object of the present invention is to provide a ventilation addition to a vehicle having a flexible hose attached to the vent by a sleeve element.

Yet another object of the present invention is to provide a ventilation addition to a vehicle having a flexible hose attached to the vent and attached to the existing air duct by a sleeve element located under the front seat of a vehicle.

Still yet another object of the present invention is to provide a ventilation addition to a vehicle that is secured in place by means of hook and loop fasteners attached to the top portion of the vent and its counter part attached to the bottom rear portion of the seat.

Another object of the present invention is to provide a ventilation addition to a vehicle that improves the air circulation to the rear occupants of a vehicle.

Additional objects of the present invention will appear as the description proceeds.

The present invention overcomes the shortcomings of the prior art by providing a ventilation extension addition to a vehicle and is attached to the existing ventilation duct located mid-way under the front seats of some sports utility vehicles. The location of the existing ventilation duct restricts any air or heat from getting to the rear seat occupants. The present invention, a vehicle air ventilation extension kit consists of a flexible hose attached at one distal end to an adjustable vent and attached at the other distal end, by means of a sleeve, to the existing air duct located under the front seat of a vehicle. The air vent of the present invention is secured in place by means of hook and loop fasteners attached to the top portion of the vent and its counter part attached to the bottom rear portion of the seat. The flex hose allows the seat to move back and forward without the disconnection of attached parts.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

DESCRIPTION OF THE DRAWINGS

In order that the invention may be more fully understood, it will now be described, by way of example, with reference to the accompanying drawings in which.

LIST OF REFERENCE NUMERALS

Figure 1:
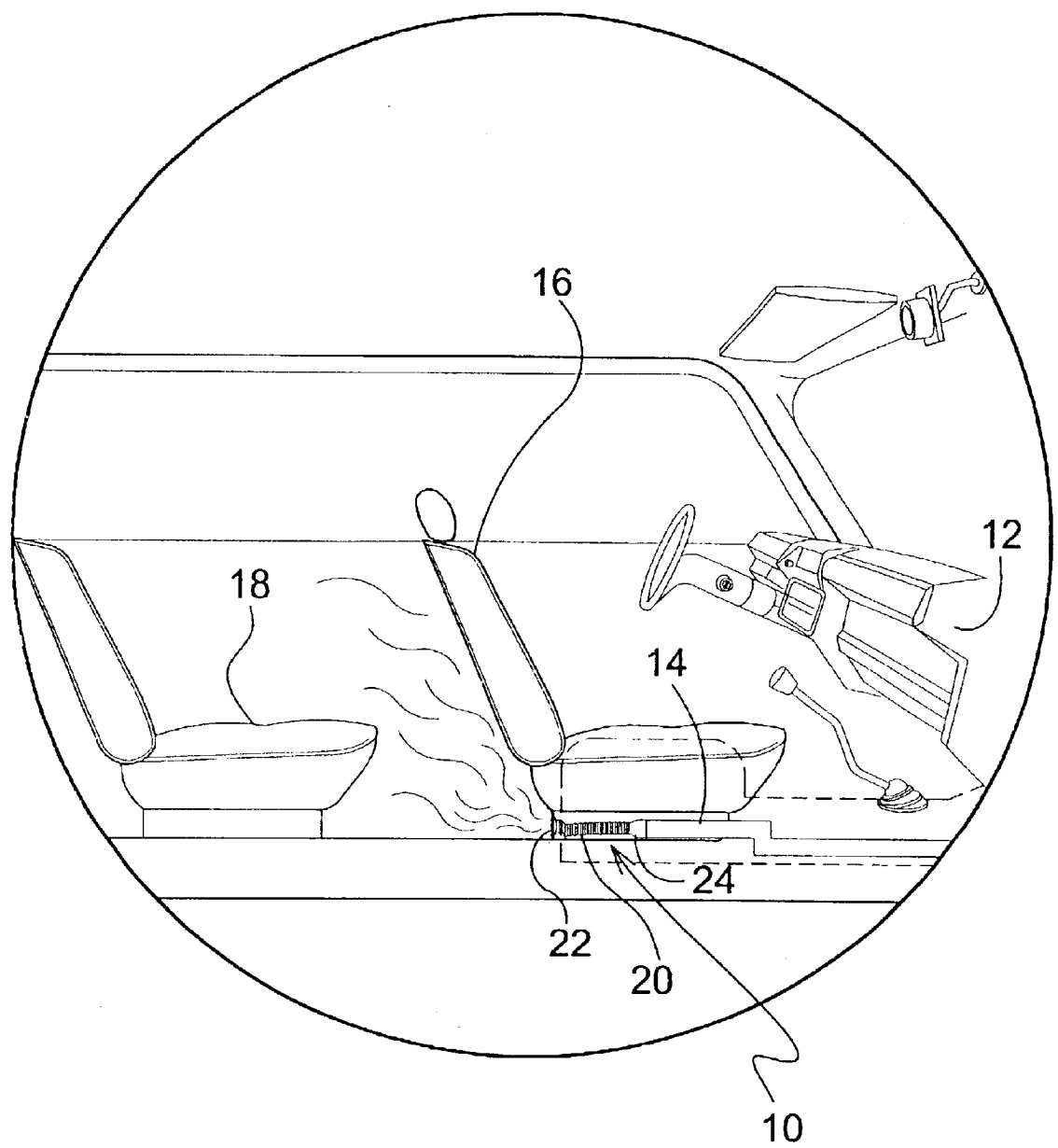
FIG. 1 is an illustrative view of the present invention in use.

With regard to reference numerals used, the following numbering is used throughout the drawings.

10 present invention
12 vehicle
14 existing air duct
16 front seat
18 rear seat
20 hose
22 adjustable air vent 24 sleeve
26 hook and loop material
28 air circulation
30 center console
32 flange
34 vent adjustment
36 louvers
38 vent line
40 blower

DETAILED DESCRIPTION OF THE PREFERRED EMBODIMENT

The following discussion describes in detail one embodiment of the invention. This discussion should not be construed, however, as limiting the invention to those particular embodiments since practitioners skilled in the art will recognize numerous other embodiments as well. For a definition of the complete scope of the invention, the reader is directed to the appended claims.

Turning to FIG. 1, shown therein is an illustrative view of the present invention 10 in use. The present invention 10 is a vent addition for a vehicle 12 that is attached to the existing ventilation or air duct 14 located mid-way under the front seats 16 of some sports utility vehicles. The location of the existing ventilation duct 14 restricts air or heat from getting to the rear seat 18 occupant area. The present invention 10 discloses a vehicle air ventilation extension kit comprises an accordion-like hose 20 attached at one distal end to a provided adjustable vent 22 and at the other distal end, by means of a sleeve 24, to the existing vehicle air duct 14 located under the front seat 16. The air vent 22 of the present invention 10 is secured in place by means of hook and loop fasteners attached to the top portion of the provided vent 22 and its mating part attached to the bottom rear portion of the front seat 16. The flex hose 20 allows the front seat 16 to move backward and forward without the disconnection of attached parts.

Figure 2:
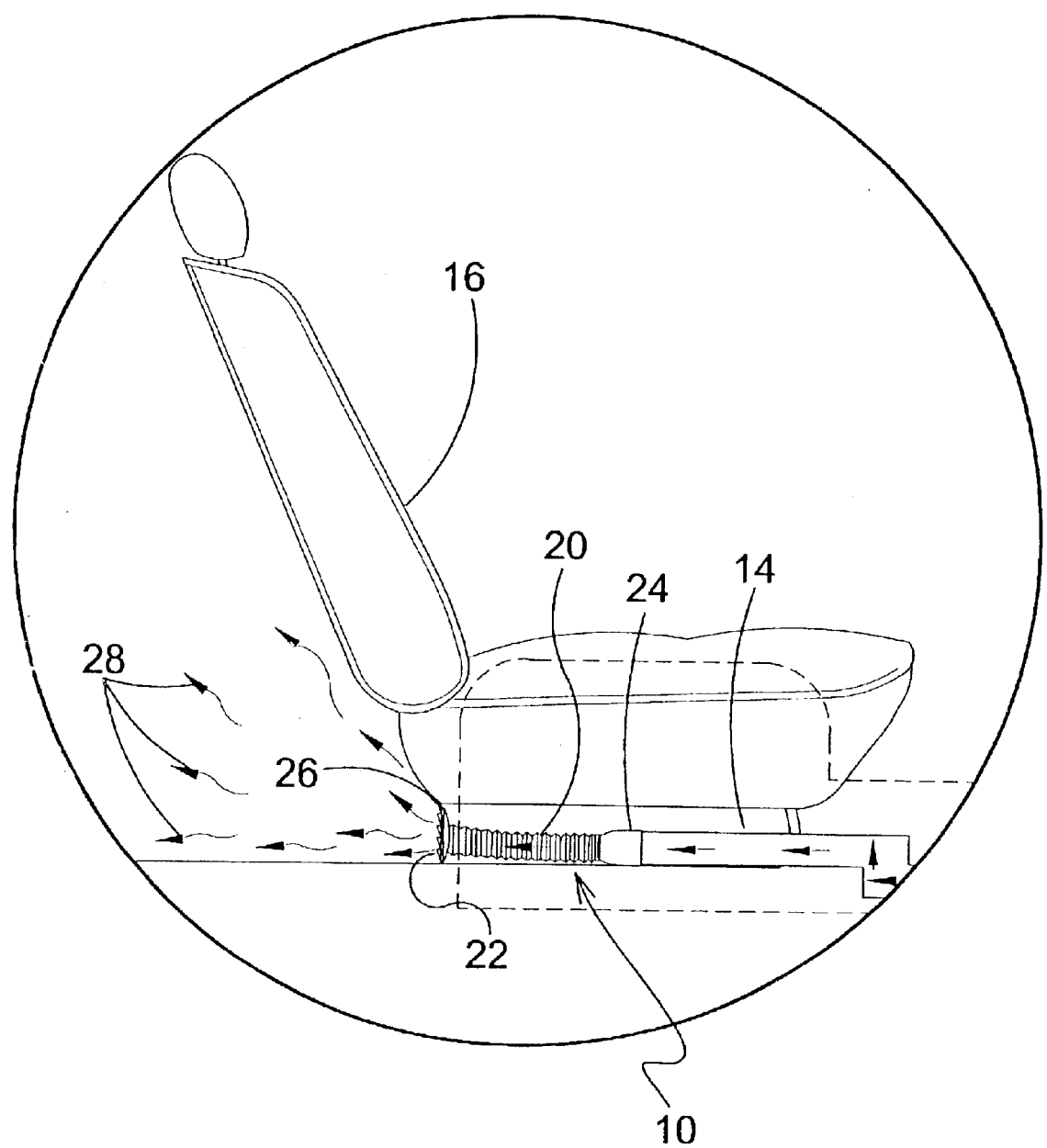
FIG. 2 is a side view of the present invention in use.

Turning to FIG. 2, shown therein is a side view of the present invention 10 in use. The present invention 10 is a vehicle air vent extension kit comprising an accordion-like hose 20 and adjustable louvered vent 22. The accordion-like hose 20 is attached to the provided vent 22 at one distal end having a sleeve 24 that mates over the existing duct 14 located in the space between the floor board and the underside of the front seat 16 of a vehicle. The louvered vent 22 of the present invention 10 is secured by means of hook and loop material 26 attached to the top portion of the provided vent and to a mating piece of hook and loop material fastened to the bottom, rear portion of the vehicle front seat 16. The accordion-like hose 20 allows the seat 16 to move forward and back without disconnecting the vent extension. Air circulation arrows 28 are also shown.

Figure 3:
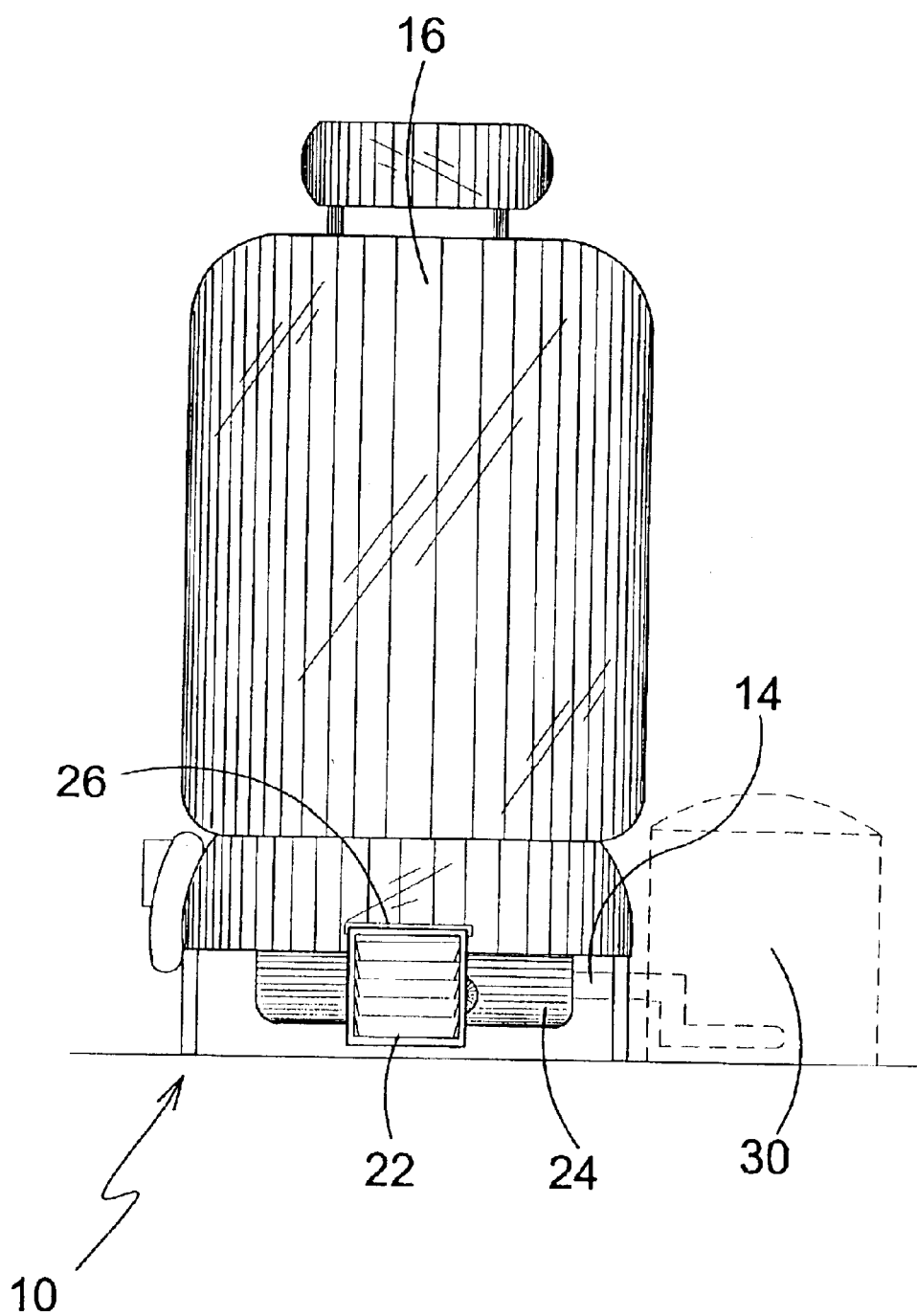
FIG. 3 is a rear view of the present invention in use.

Turning to FIG. 3, shown therein is a rear view of the present invention 10 in use. The present invention 10 discloses a vehicle air vent extension kit which comprises a flexible hose attached to the provided vent 22 and attached by its sleeve 24 to the existing duct 14 located under the front seat 16 of a vehicle. The air vent 22 of the present invention 10 is secured in place by means of hook and loop fasteners 26 attached to the top portion of the vent 22 and its mating counter part attached to the bottom rear portion of the seat 16. The flex hose allows the seat 16 to move back and forward without the disconnection of attached parts. The center console 30 of the vehicle is also shown.

Figure 4:
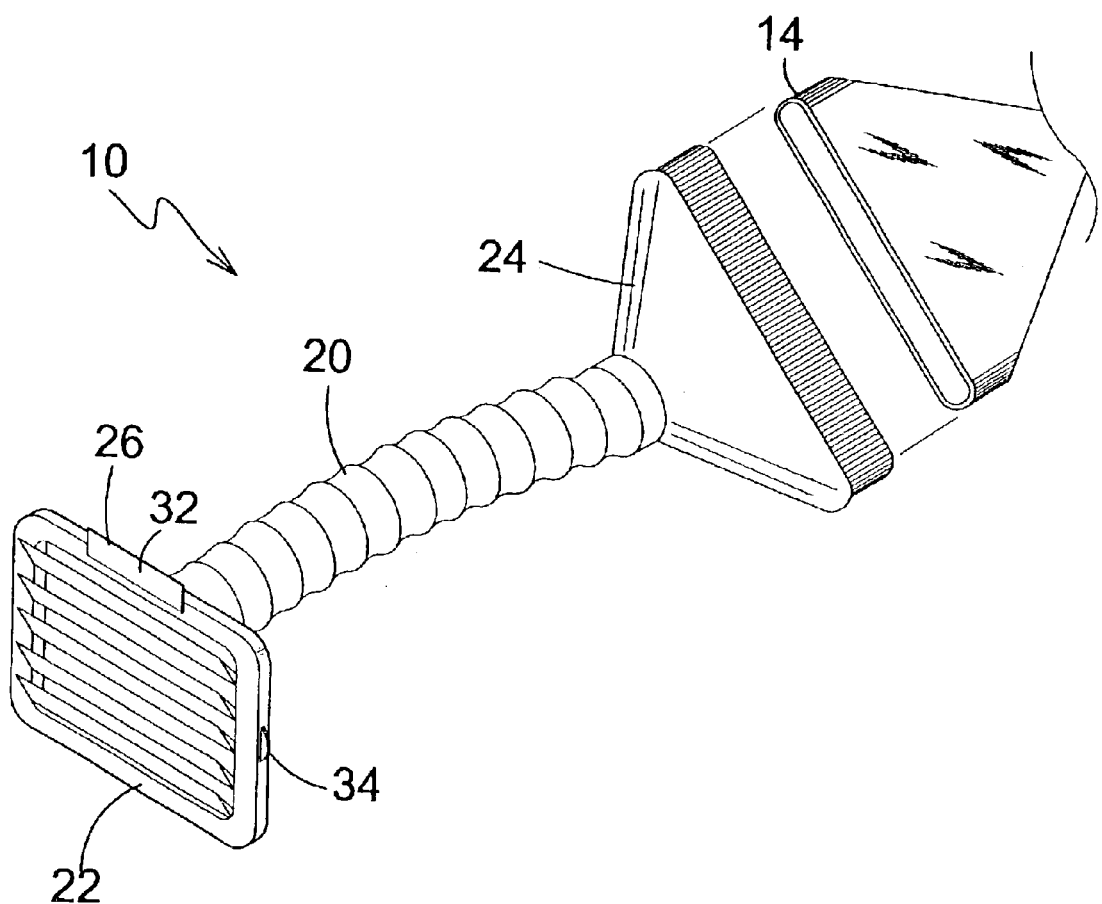
FIG. 4 is an exploded view of the present invention.

Turning to FIG. 4, shown therein is an exploded view of the present invention 10. Shown is the present invention 10 comprising an extender for a vent 14. The extension has a shape conforming substantially to the existing vent 14 whereby one distal end of the vent extension has a low profile or low height sleeve 24 which is inserted over the vent and fictionally held thereto. The other distal end of the vent has a frame 22 with a flange 32 with hook and loop material 26 that is mated with hook and loop material selectively placed on the rear of the seat. The frame 22 houses a plurality of louvers 36 whereby the amount of air can be varied by adjusting at 34 the louvers. Positioned between the distal ends of the vent is an accordion-like conduit 20 whereby adjustment of the front seat is possible without affecting the vent extender.

Figure 5:
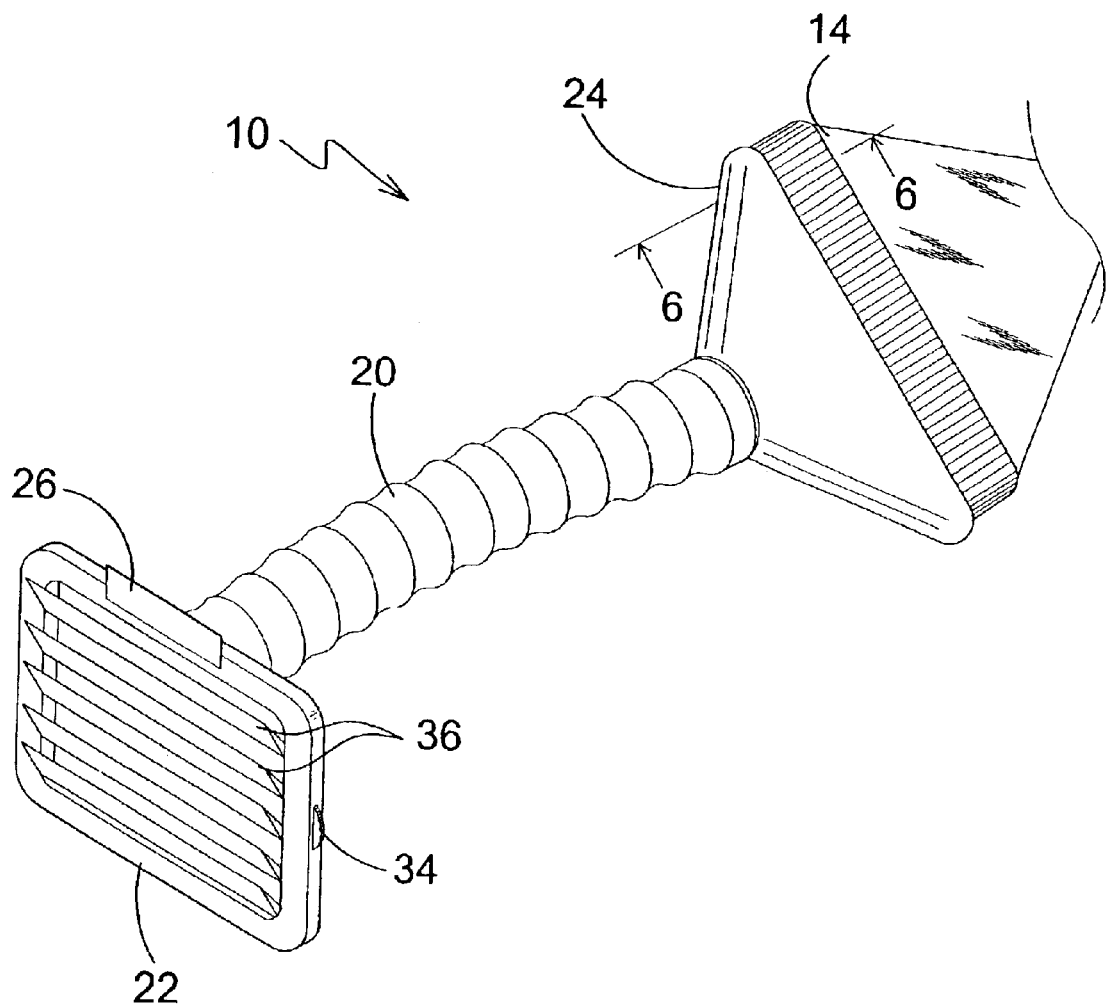
FIG. 5 is a perspective view of the present invention assembled.

Turning to FIG. 5, shown therein is a perspective view of the present invention 10. Shown is the vent of the present invention 10 mated to the existing motor vehicle vent 14 thereby extending the vent port to a position more ergonomically positioned to the rear seat passengers. The vent extension is comprised of an accordion-like 20 conduit having a fitting or sleeve 24 on one distal end for mating to the existing vent. The other end has a frame 22 that can be mounted to the rear of the front seat by means of hook and loop material 26. The frame houses a plurality of louvers 36 whereby the amount of air can be varied by adjusting the louvers. Adjustment at 34 of the front seat is possible without affecting the vent extension.

Figure 6:
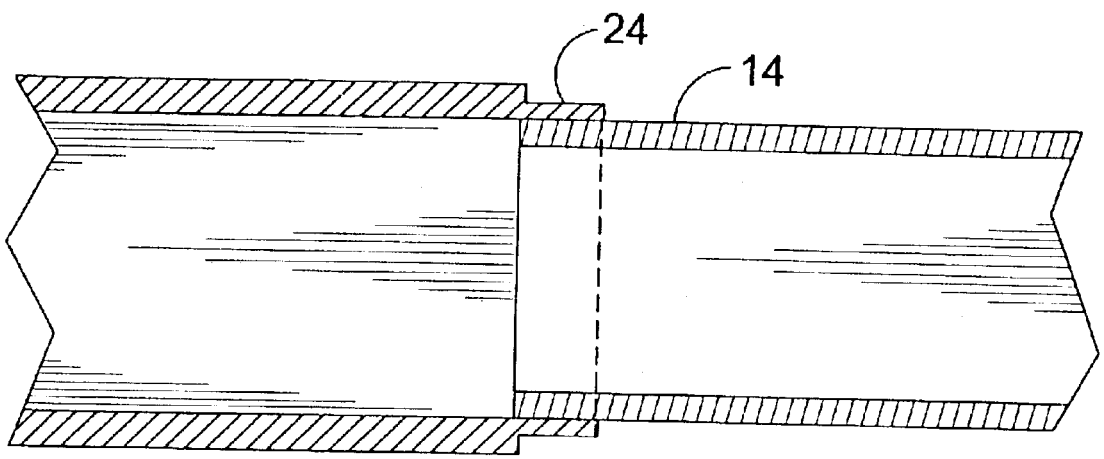
FIG. 6 is a cross sectional view of the mating vent apertures.
Figure 7:
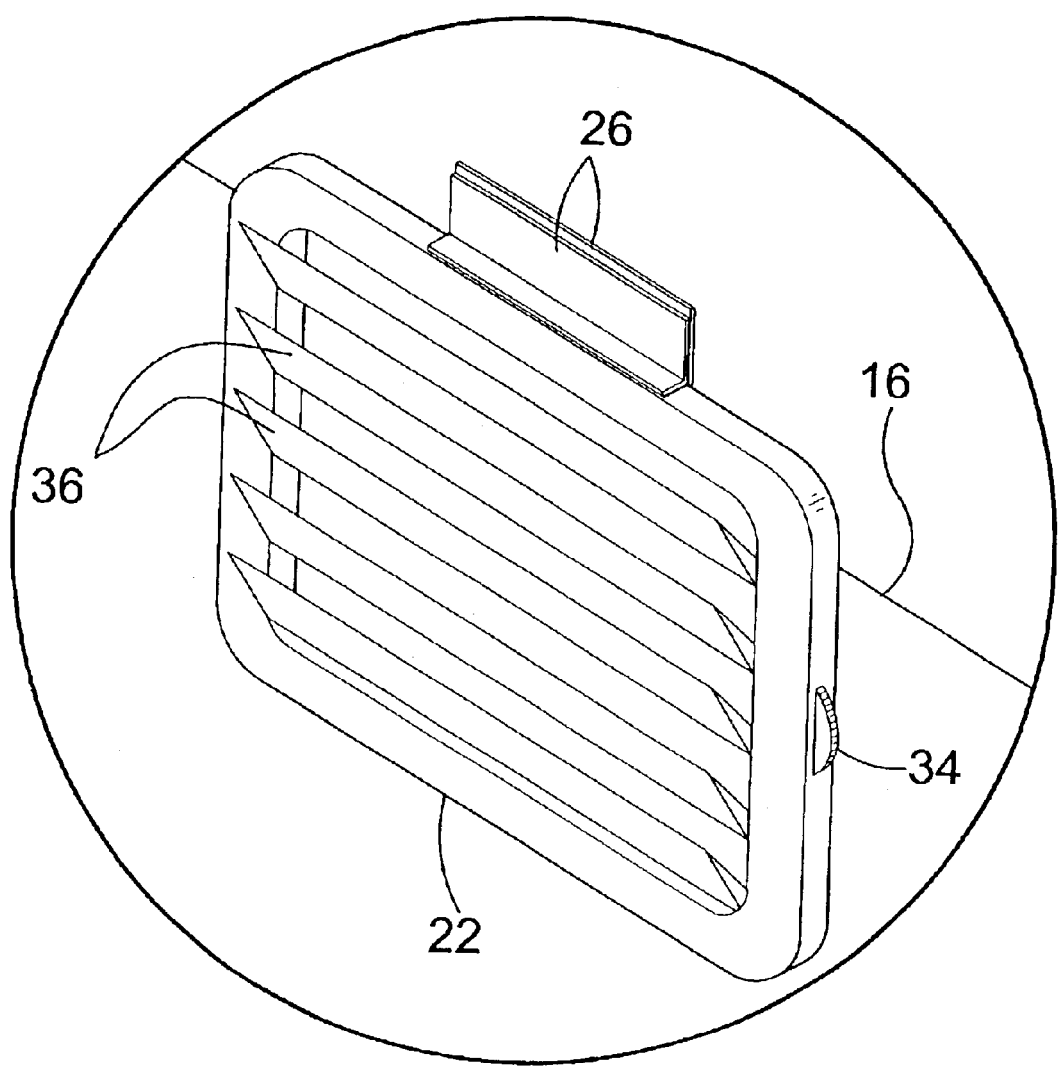
FIG. 7 is a detailed view of the present invention.

Turning to FIG. 6, shown therein is a cross sectional view of the mating vent apertures. Shown is a cross sectional view of the mating vent apertures, taken from FIG. 5 as indicated. The vent extension has a fitting or sleeve 24 that is attachable over the vent 14 aperture of the existing vehicle underseat vent 14. The fitting 24 is of substantially the same shape as the existing vent 14, so that once inserted it is frictionally held thereon. Turning to FIG. 7, shown therein is an enlarged view of the provided louvered vent 22. The present invention 10 is a vehicle air vent extension kit that is comprised of an accordion-like flexible hose having a sleeve on one distal end conforming substantially in shape to a vehicle's vent located underneath the front seat whereby the sleeve can be inserted over the existing vent and frictionally held thereto. The other end of the flexible hose is connected to a housing having a frame or vent 22 with a plurality of louvers 36 positioned therein. Located on the frame housing is a control mechanism at 34 for varying the inclination of the louvers 36 whereby they can be selectively positioned to direct the hot or cold airflow. The housing 22 has mating hook and loop material 26 fastened on the top that is mated to hook and loop material that is selectively fastened to the bottom backside of the front scat 16. The flexible hose provides for movement of the front seat 16 without dislocation of the provided vent 22 or sleeve attachment.

Figure 8:
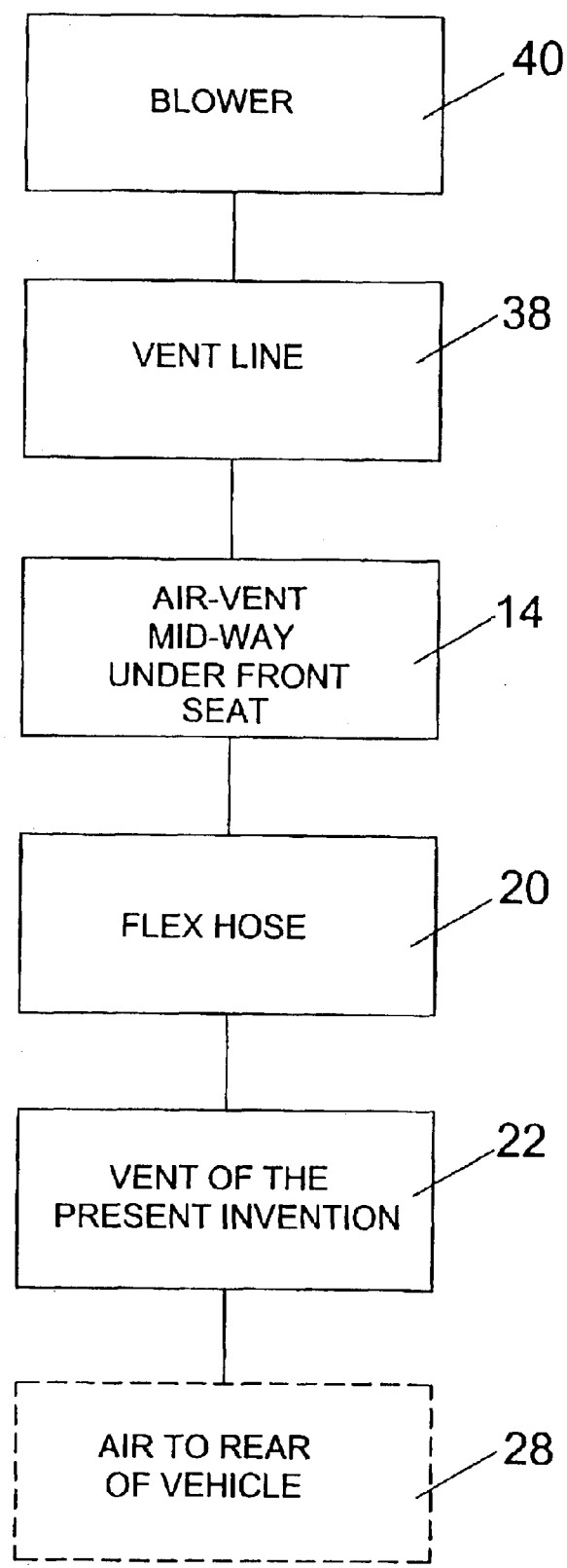
FIG. 8 is a flow chart of the present invention.

Turning to FIG. 8, shown therein is a flow chart of the present invention. Shown is the present invention which discloses a vehicle air vent extension kit comprising a flexible hose 20 attached to the provided vent 22 and attached by a sleeve to the existing duct 14 located under the front seat of a vehicle. The air vent 22 of the present invention is secured in place by means of hook and loop fasteners attached to the top portion of the vent and its counter part attached to the bottom, rear portion of the seat. The flex hose 20 allows the seat to move back and forward without disconnection of the attached parts. The present invention directs air circulation to the rear seat area of the vehicle. The existing air duct 14 is connected by a vent line 38 to the blower 40 of the vehicle.

I claim:

1. An apparatus for providing an air outlet duct extension for connection to the existing air outlet duct of a vehicle in combination, comprising:

a) a vehicle, said vehicle having a front seat and a rear seat for seating vehicle occupants thereon, said front seat having a front, a rear, a driver's side portion and a passenger side portion, said vehicle having a floor board, said front seat having a bottom elevated above said floor board for forward and rearward movement with respect to said floor board, wherein a space is formed between said floor board and said bottom of said seat, said vehicle having a heating and cooling system for producing a stream of heated or cooled air;

b) an existing air outlet duct disposed in said space between said front and rear of said front seat having an outlet opening under said front seat to permit the stream of heated or cooled air to be directed toward the rear seat of the vehicle;

c) a sleeve connecting to the outlet opening of said existing air outlet, said sleeve having a front and a rear end, said front end of sad sleeve being connected to said existing air outlet, said sleeve being complementarily shaped as said existing air outlet to permit a sealed connection between the sleeve and the existing air outlet, said rear end of said sleeve having an outlet therein;

d) a conduit having a first and second end, said first end of said conduit connecting to said rear end of said sleeve to permit air to flow through the conduit; and, e) an air vent comprising a rectangular frame with louvers within said frame disposed on said second end of said conduit whereby the flow of air through the air vent is controlled;

f) said rectangular frame having a top member, a section of hook and loop material attached to said top member and extending upwardly from said top member; and g) a section of mating hook and loop material attached to a lower end of the rear of said front seat, said hook loop material extending up from said frame member releasably engaged with said mating hook and loop material so that said air vent moves with said front seat as said front seat is moved forwardly or rearwardly, said conduit being an accordion style conduit to allow the front seat to move backward and forward without disconnecting the apparatus.

2. The apparatus of claim 1, wherein said louver of said air vent are adjustable to vary the direction of the flow of air.

3. The apparatus of claim 2, wherein said sleeve has a top, a bottom and a pair of sides, said top and bottom being of greater length than said sides to permit the sleeve to have a low profile under the front seat.

* * * * *